United States Patent [19]

Atalla

[11] 4,281,215
[45] Jul. 28, 1981

[54] METHOD AND APPARATUS FOR SECURING DATA TRANSMISSIONS

[75] Inventor: Martin M. Atalla, Menlo Park, Calif.

[73] Assignee: Atalla Technovations, Sunnyvale, Calif.

[21] Appl. No.: 902,444

[22] Filed: May 3, 1978

[51] Int. Cl.³ .............................................. H04L 9/00
[52] U.S. Cl. ................................. 178/22.08; 235/380; 340/149 R
[58] Field of Search ......... 178/22; 340/149 R, 149 A, 340/152 R; 235/380

[56] References Cited

U.S. PATENT DOCUMENTS

| | | | |
|---|---|---|---|
| 3,654,604 | 4/1972 | Crafton | 340/149 R |
| 3,938,091 | 2/1976 | Atalla et al. | 340/152 R |
| 3,956,615 | 5/1976 | Anderson | 178/22 |
| 3,985,998 | 10/1976 | Crafton | 340/149 A |
| 4,004,089 | 1/1977 | Richard et al. | 340/149 A |
| 4,025,760 | 5/1977 | Trenkamp | 340/149 A |
| 4,048,475 | 9/1977 | Yoshida | 235/380 |
| 4,123,747 | 10/1978 | Lancto et al. | 235/380 |

OTHER PUBLICATIONS

"New Directions in Cryptography", Diffie et al., IEEE, Transactions on Information Theory, vol. IT-22, No. 6, Nov. 76, pp. 644-654.

Primary Examiner—Howard A. Birmiel
Attorney, Agent, or Firm—A. C. Smith

[57] ABSTRACT

A method and apparatus are provided for improving the security of data transmissions between stations. The method obviates the need for transmitting user-identification information such as personal identification number (PIN) from station to station, e.g., from the station utilized by the user to enter his PIN and initiate a transaction, to the station that processes the transaction. Also, for added security, the method provides for encryption (encoding) and decryption (decoding) of data during a transaction using encryption and decryption keys produced from different (independent) PINs. The apparatus includes at least one irreversible algorithm module, a random number generator and at least one data file (e.g., disc or magnetic tape storage). The apparatus also includes a comparator or, alternatively, an encoding algorithm module and a matching decoding algorithm module.

5 Claims, 8 Drawing Figures 4,281,215

METHOD AND APPARATUS FOR SECURING DATA TRANSMISSIONS

BACKGROUND OF THE INVENTION

Numerous methods and apparatus have been developed for transmitting messages in a secure manner between stations. Many of the methods and apparatus provide for coding of the message prior to transmission and for decoding of the message at its destination subsequent to transmission. Two such methods and apparatus are described, for example, in U.S. Pat. No. 3,711,645 issued Jan. 16, 1973 to Kurt Ehrat, entitled Method and Apparatus for Coding Messages, and in U.S. Pat. No. 3,956,615 issued May 11, 1976 to Thomas G. Anderson, William A. Boothroyd and Richard C. Frey, entitled Transaction Execution System with Secure Data Storage and Communications. A third method and apparatus is described, for example, in U.S. Pat. No. 3,938,091 issued Feb. 10, 1976 to Martin M. Atalla, entitled Personal Verification System.

A common feature of such apparatus is the use of fixed, predetermined encoding-decoding keys to encode and decode data, or the use of variable encoding keys transmitted with the encoded message to a destination station for processing (the variable encoding keys being supplied by the user, or generated by the apparatus from user-supplied information). At the destination station, the transmitted variable-key is utilized by a decoder of the apparatus to decode the encoded message.

Whereas the use of variable rather than fixed encoding-decoding keys would seem to provide a greater measure of security in message transmission than do fixed keys (especially variable keys supplied by a user or generated by the apparatus from user-supplied information), the practice of transmitting a variable key so that it can be used in the decoding process reduces the security of the operation because unauthorized users could conceivably gain access to the key during the transmission of the key. It would be desirable, therefore, in improving the security of such data transmission operations (especially bank transaction operations or the like which require not only secure transmission of data but also accurate identification of users) to use a technique which provides for secure transmission of data without requiring transmission of matching encoding-decoding keys or of user-identification information.

SUMMARY OF THE INVENTION

In accordance with the illustrated preferred embodiment of the present invention, a method and apparatus are provided for improving security of data transmission between stations by making it unnecessary to transmit user-identification information between the stations. Also, to further improve security, an alternative method provides for encoding and decoding the data during each transaction, using encoding and decoding keys produced from different PINs (*Personal Identification Number* entered into the apparatus by a user to initiate a transaction such as a bank deposit or withdrawal transaction). The apparatus includes at least one irreversible algorithm module, a random number generator, and at least one data file. One embodiment of the apparatus also includes a comparator; another embodiment of the invention also includes an encoding algorithm module and a matching decoding algorithm module.

DESCRIPTION OF THE PREFERRED EMBODIMENT

Figure 1A:
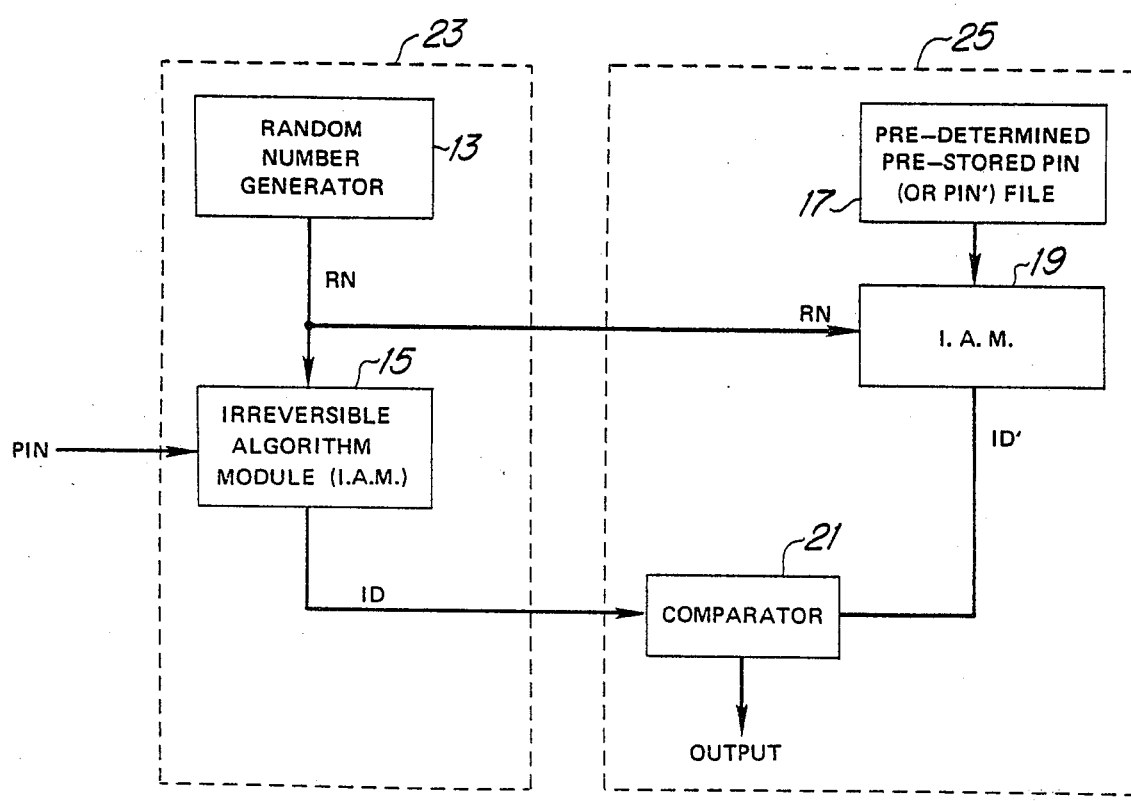
FIGS. 1A and 1B are block diagrams showing, respectively, the apparatus and method of the present invention.
Figure 1B:
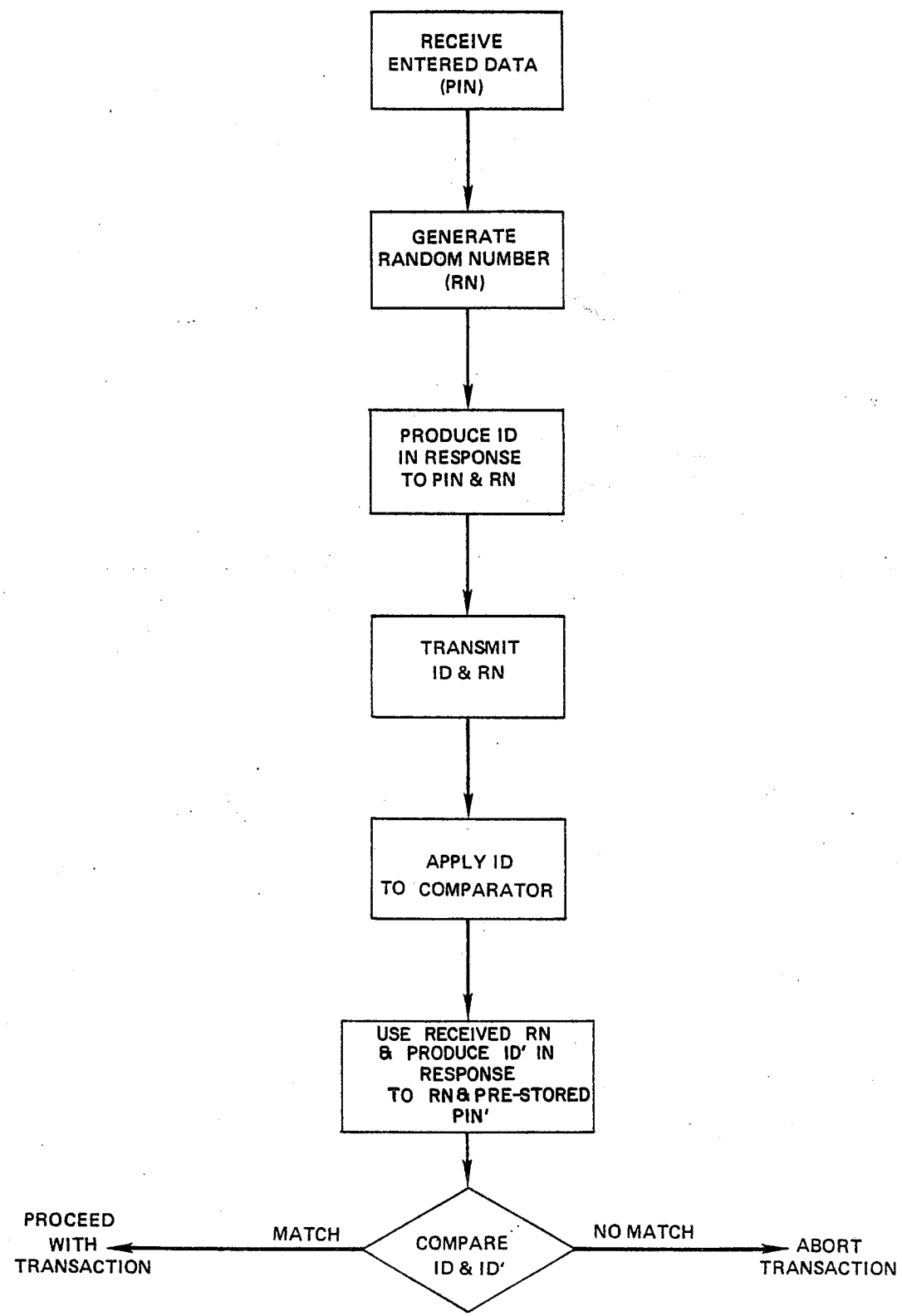

Referring now to FIGS. 1A and 1B, there are shown an apparatus and a method for improving the security of transmitted data between stations. The apparatus and method offer improved security by not requiring the transmission of PIN data from the originating or user station to the destination or processing station. The apparatus comprises at a transmitting location 23 a random number generator 13, and an irreversible algorithm module (I.A.M.) 15 (for example, of the type disclosed in U.S. Pat. No. 3,938,091 issued on Feb. 10, 1976 to M. M. Atalla and A. F. Liu), and further comprises a storage file 17, another irreversible algorithm module 19, and a comparator 21 at a receiving location 25. In response to PIN data entered by a user and in response to a random number (RN) produced by random number generator 13, algorithm module 15 produces a user identifier code (ID) which may be transmitted and applied to comparator 21 at the receiving location. The RN produced by random number generator 13 is also transmitted to an I.A.M. 19 in the receiving station 25. A predetermined authentic PIN (pre-stored in a selected register of storage file 17) may be accessed and applied to algorithm module 19 along with the received RN to produce a new user identifier code (ID'). The algorith module 19 encrypts or encodes the signals applied thereto in a manner which is identical to module 15. The previously produced user identifier code (ID) is then compared with the newly produced user identifier code (ID') by comparator 21. If a match occurs (i.e., if ID and ID' are found to be the same), an output data value is produced (or internal flag is set) indicating that the transaction (e.g., user withdrawal of money from a bank) should proceed. If no match occurs, comparator 21 produces an output value indicating that the transaction should not proceed.

From the above-described apparatus and method of FIGS. 1A and 1B, therefore, it is seen that no personal identification number of the user (PIN) is transmitted from the originating or user location 23 to the destination or receiving location 25.

Figure 2A:
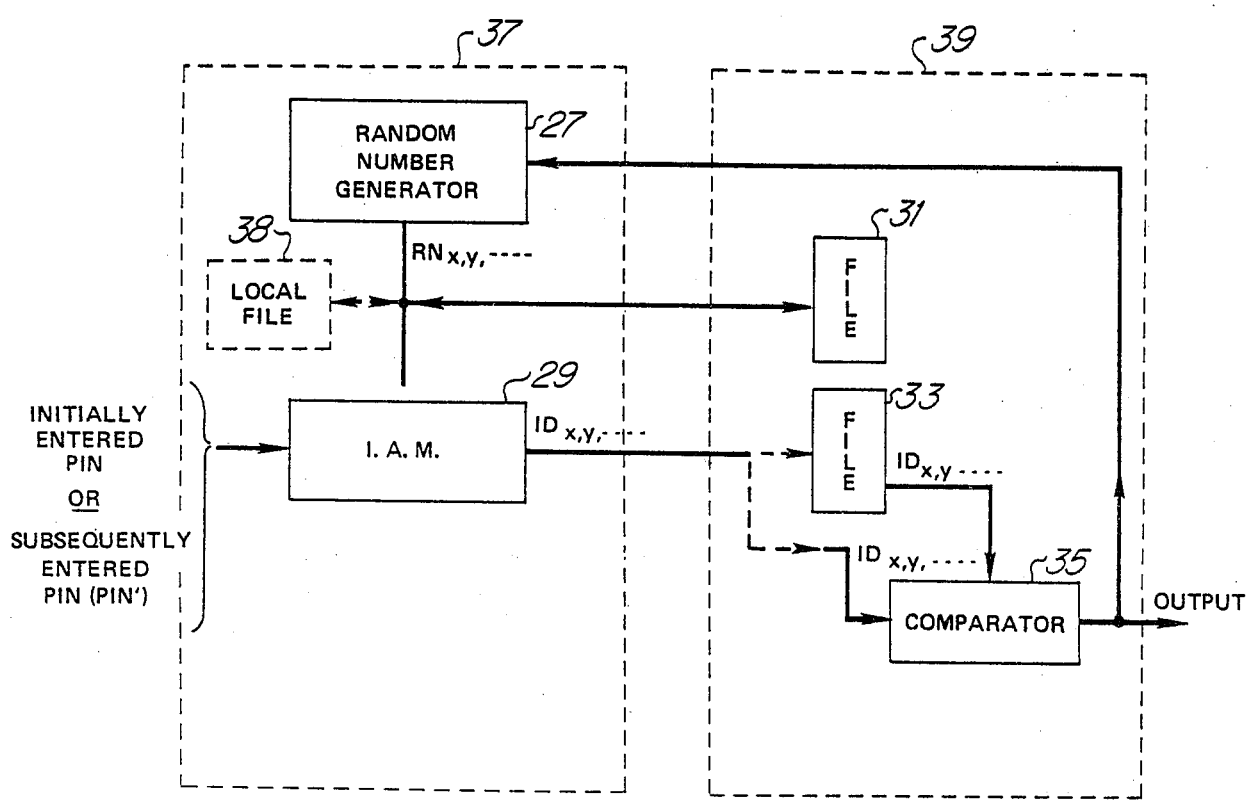
FIGS. 2A and 2B are block diagrams showing, respectively, alternative embodiments of the apparatus and method of the present invention.
Figure 2B:
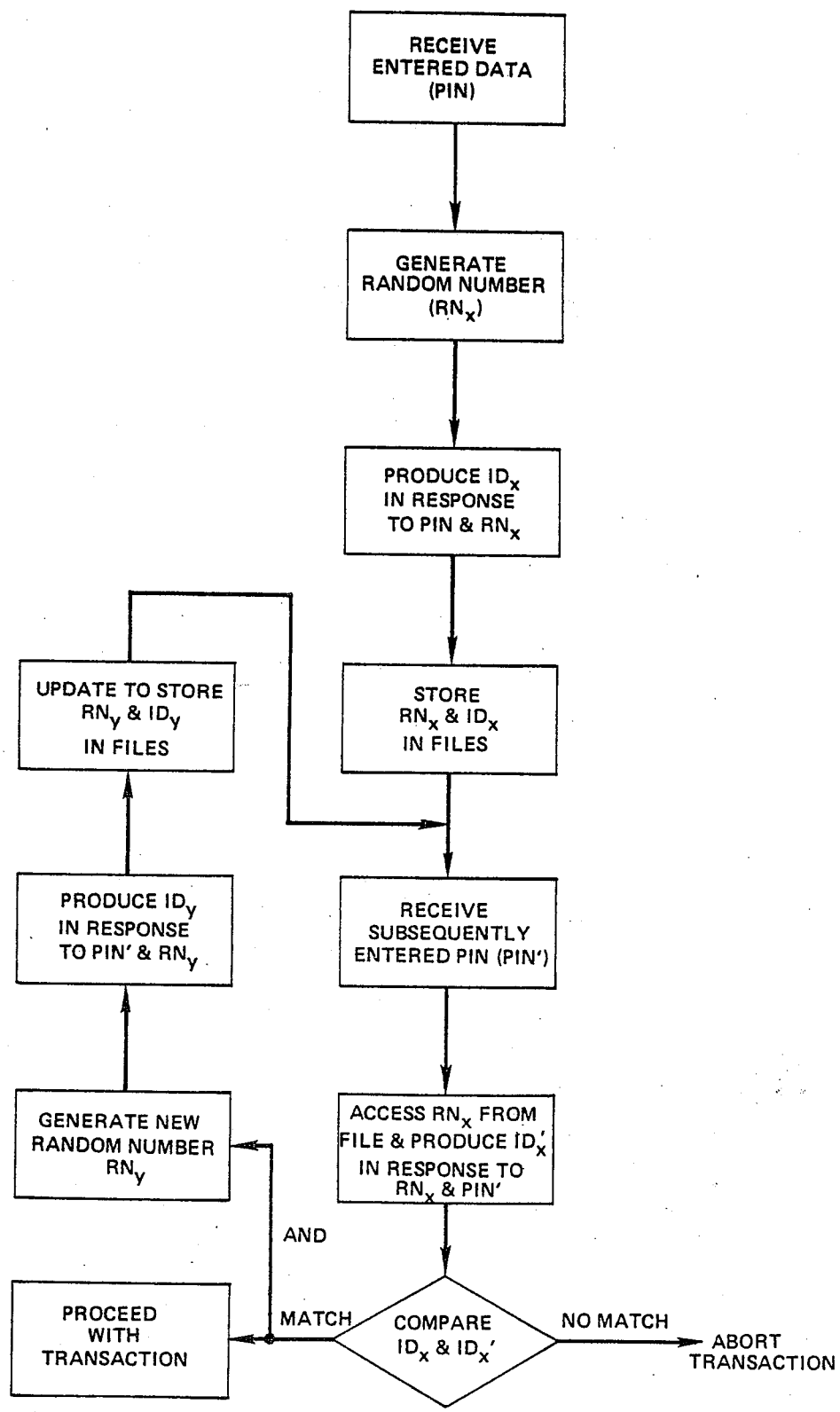

Another embodiment of the present invention is shown in FIGS. 2A and 2B. In this embodiment, the user identifier code (ID) is produced in response to RN and to entered PIN data in a manner similar to that shown in FIGS. 1A and 1B. However, only RN and ID are transmitted from user station 37 to file storage 31, 33 at processing station 39. In this embodiment, no PIN is transmitted between stations, nor is the PIN stored in the file 31, 33 where it may be susceptible to unauthorized access.

In this embodiment, the present apparatus operates, as shown in FIG. 2B, to update the identifier code ID and the random number RN in storage files each time a proper verification of user is established. Thus, a user's initial entry of a PIN is combined with an RN via an irreversible algorithm module of the type previously described to produce an ID which, with the associated RN, may be transmitted and stored in files 31, 33 at the receiver station 39 (and optionally at a local file 38).

Thereafter, the authorized user again enters his PIN (referred to herein as PIN'), and the RN is accessed from the file 31 (or optionally from the local file 38). The PIN' and the retrieved RN ($RN_x$ herein) are encrypted by the algorithm module 29 to produce the ID (which should be identical to the ID in file 33) for transmission to comparator 35 at the receiving station 39. There, the comparison is made with the ID retrieved from file 33. If the match is detected, the output from comparator 35 provides the indication that the present transaction may proceed, and also initiates the generation of a new random number $RN_y$. This new random number is encrypted by the algorithm module 29 along with the PIN' which was entered in the present transaction to yield the new $ID_y$. The new $RN_y$ and new $ID_y$ are then transmitted to files 31, 33 (and optionally to local file 38) to supplant $RN_x$ and $ID_x$ previously stored therein. In this manner, a user identifier code is dynamically stored and updated each time an authorized user is verified. More importantly, however, no PIN need be stored or transmitted in order to verify the authorized user.

Figure 3A:
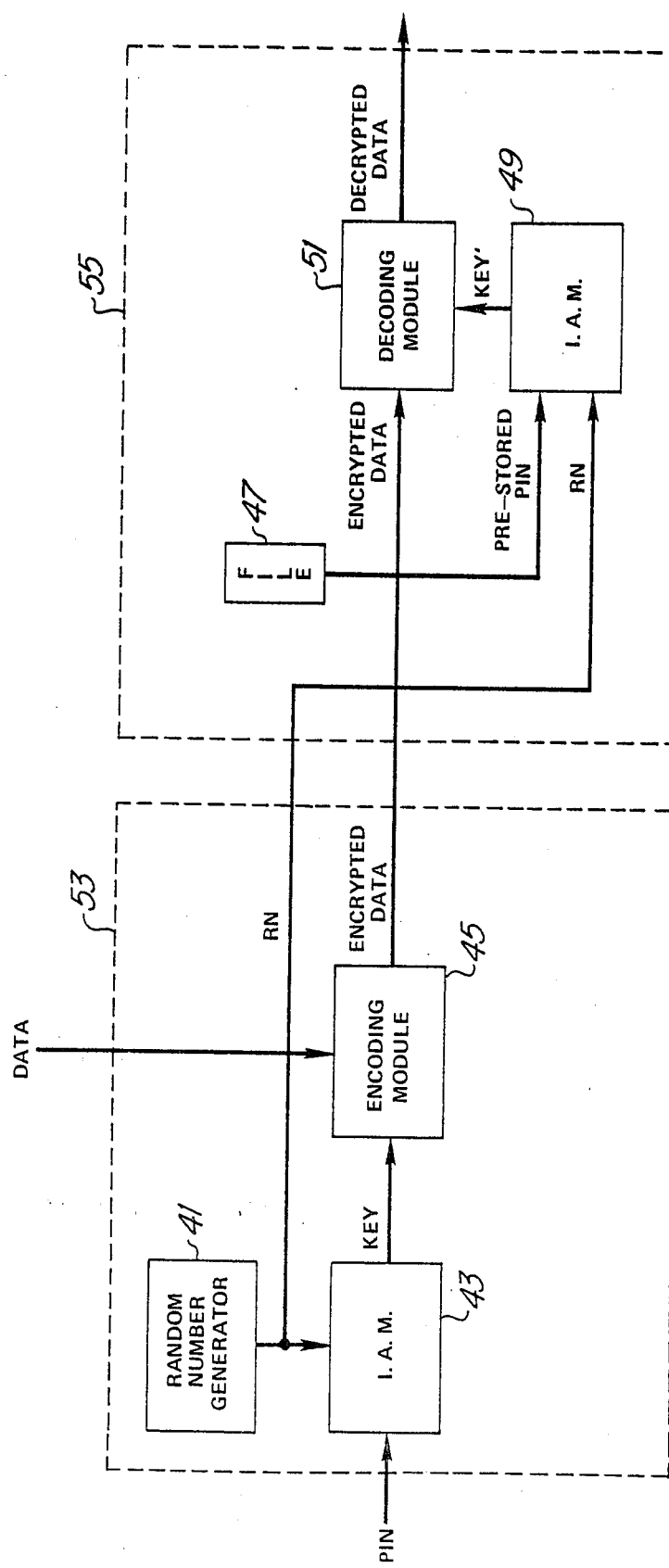
FIGS. 3A and 3B are block diagrams showing, respectively, other alternative embodiments of the apparatus and method of the present invention.
Figure 3B:
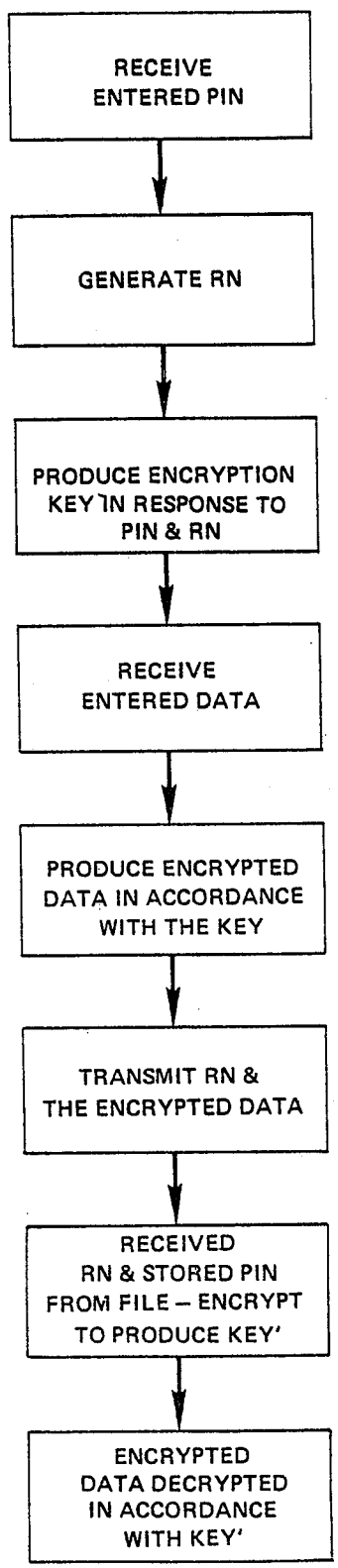

Referring now to the embodiment of the present invention, as illustrated in FIGS. 3A and 3B, a PIN in storage 47 is used with a random number RN to produce a KEY code by which data may be encrypted (encoded). However, the KEY code used to encrypt data is not transmitted. In response to a PIN entered by a user and a random number (RN) generated by a random number generator 41, irreversible algorithm module 43 of the type previously described produces an encryption key (KEY) which is applied to encoding algorithm module 45 (e.g., an encoder such as The Bureau of Standards Chip incorporating the National Bureau of Standards' encryption-decryption algorithm which is the Federal Information Processing Standard approved by the U.S. Department of Commerce). In response to applied data, encoding module 45 encodes the data in accordance with the encryption key (KEY). The encoded data, together with the associated random number (RN) is then transmitted from user station 53 to processing station 55. The random number (RN) thus received by station 55 and the pre-stored authentic PIN which is accessed from file 47 are applied to algorithm module 49 which produces an encryption key (KEY') that should be identical to the KEY, and this KEY' is applied to decoding module 51. Decoding module 51 operates in accordance with the same National Bureau of Standards encoding scheme as module 45 and produces the desired decrypted (decoded) data. It should be noted that as long as the entered PIN matches the pre-stored PIN, KEY will match KEY', and the decrypted data will match the entered data. This embodiment of the present invention thus obviates the need to transmit the generated KEY between stations and eliminates risk of disclosure of the KEY during such transmission. Also, it should be noted that in this embodiment, the KEY is determined and the PIN is verified simultaneously under the control of the user. That is, the encryption and decryption of data is solely under the control of the user by virtue of his own entered PIN. Also, the user who entered the PIN is verified in response to the encrypted data being received and decrypted at the receiver station 55 using the corresponding PIN that is retained in file 47. Further, the information which is transmitted between stations includes a random number which changes after each transaction and the encrypted data which also changes from after each transaction, even for the same data entered at station 53.

Figure 4A:
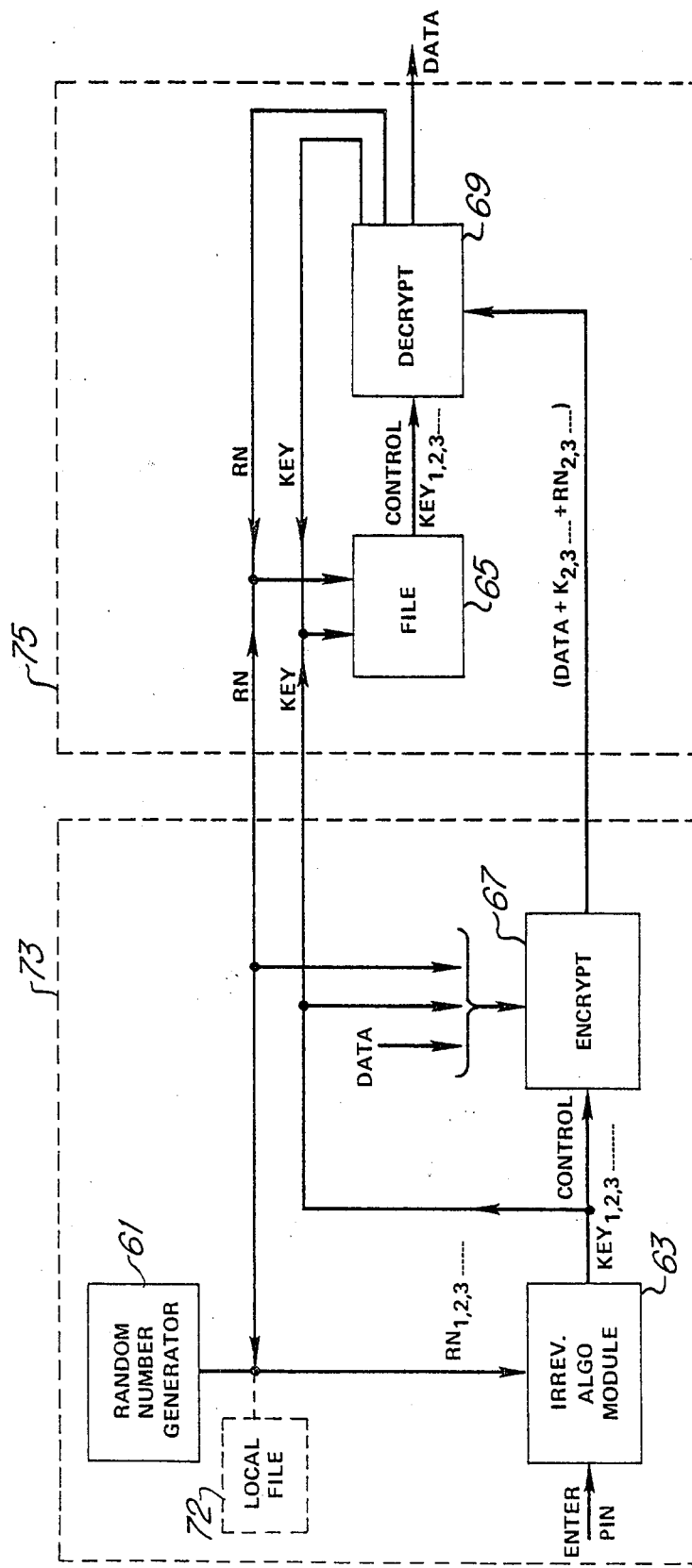
FIGS. 4A and 4B are block diagrams showing, respectively, still other alternative embodiments of the apparatus and method of the present invention.
Figure 4B:
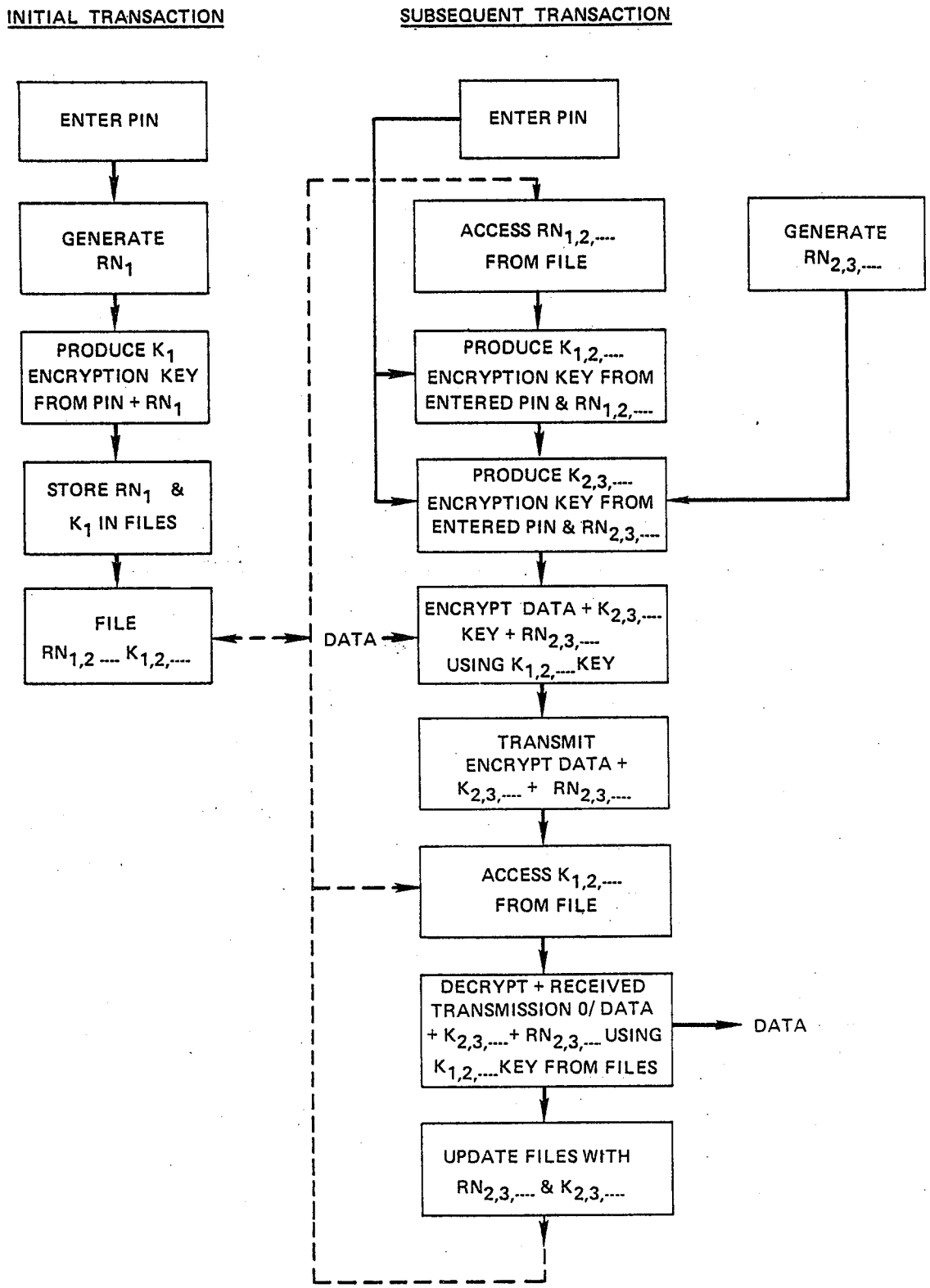

In the embodiment of the present invention shown in FIGS. 4A and 4B, there is no need to transmit the PIN from user station 73 to processing station 75, and no need to store PIN information in a file. As shown in FIGS. 4A and 4B, the system is first initialized in preparation for user transactions. The PIN is entered by the user during initialization and random number generator 61 generates a random number ($RN_1$) and applies the $RN_1$ to irreversible algorithm module 63 of the type previously described. Module 63 combines the PIN and $RN_1$ information and produces therefrom a first encryption key ($KEY_1$) to be used in later encryption of data. The $RN_1$ and $KEY_1$ are then stored for later retrieval in a storage file 65 at the processing station 75 (and optionally the random number may also be stored in a local file 72).

In commencing a transaction, the user first enters his PIN into the algorithm module 63. In response to the entered PIN, and in response to $RN_1$ which is accessed from file 65 (or optionally from local file 72), the module 63 reproduces the encryption key ($KEY_1$) which is applied to the control input of the encryption module 67 (say, of the National Bureau of Standards type previously described). With the encryption module 67 set to encode in accordance with $KEY_1$, another random number ($RN_2$) is generated by random number generator 61, and is applied to modules 63 and 67. The module 63 is able to produce an encryption key ($KEY_2$) from the applied $RN_2$ and from the PIN that is available during the present user transaction. $KEY_2$ and $RN_2$ which was associated with $KEY_2$ are included with the applied data (which data may include a fixed alphanumeric reference) for encoding by module 67 under the control of $KEY_1$ to produce the encrypted message "DATA+$RN_2KEY_2$". This encrypted message is then transmitted from user station 73 to processing station 75 where decryption module 69 (matching encoding module 67) decrypts or decodes the encrypted message in accordance with $KEY_1$ which is accessed from the file 65 where it was originally entered during the initialization operation previously described. The DATA is thus retrieved in clear text and the $RN_2$ and the $KEY_2$ are also separately available for updating file 65 (and optionally local file 72) with $RN_2$ and $KEY_2$ in place of $RN_1$ and $KEY_1$, respectively.

In a subsequent transaction, the user again enters his PIN into the algorithm module 63. In response to the entered PIN, and in response to the updated $RN_2$ accessed from file 65 (or from local file 72), the module 63 reproduces the encryption key ($KEY_2$). With the encryption module 67 set to encode applied data in accordance with $KEY_2$, the random number generator 61 produces another random number $RN_3$ which is applied to the algorithm module 63 along with the PIN that is available during the present transaction to produce another encryption key ($KEY_3$). $KEY_3$ and $RN_3$ are included with the DATA that is applied to the encoding module 67 which produces the encrypted message "DATA+RN$_3$+KEY$_3$" when encrypted under the control of KEY$_2$. This encrypted message is then transmitted from user station 73 to processing station 75, where decoding module 69 decrypts the encrypted message in accordance with the KEY$_2$ which is accessed as the updated entry from file 65. The DATA is thus retrieved in clear text and the RN$_3$ and KEY$_3$ are again available to update the file 65 (and local file 72) for use in subsequent transactions.

The reference data previously referred to as being included with the input DATA may simply be a standard code word which must be extracted at the output of module 69 as an indication that the user inserted the proper PIN. In this way, the encrypted message transmitted to and received by the processing station 75 can be promptly decrypted to verify the PIN before the file 65 (or local file 72) is updated with keys and random numbers which would not relate to the authorized PIN.

Thus, it can be seen from FIGS. 4A and 4B that not only is PIN information not stored or transmitted from user station 73 to user station 75 but, for added security, the key used to encrypt data in response to a given user transaction is not the same key that is used to decrypt the encrypted data during such transaction. Also, it should be noted that the stored coded words are updated in each transaction and that these code words are under the control of the user.

It should be understood that in each of the embodiments of the present invention described above sequential numbers may be used in place of the random numbers used in the identification or encoding schemes. This permits the systems to exclude the repeating of the same data or information in subsequent transactions by enabling a check for parity of sequential numbers at the receiving stations.

I claim:

1. A method of securing the identification of an individual in data-handling operations utilizing identification information supplied by the individual, the method comprising the steps of:

generating a selected number that is different for each data-handling operation;

producing a first identification code in response to the generated selected number and to first identification information supplied by an individual;

storing the generated selected number and the first identification code;

producing a second identification code in response to the stored selected number and second identification information supplied by an individual;

comparing the stored first identification code with the second identification code to determine the authenticity of the supplied identification information;

generating a second selected number that is different for each data-handling operation;

producing a third identification code in response to the second selected number and to the second identification information supplied by the individual; and storing the second selected number and the third identification code for subsequent use.

2. A method of simultaneously securing transmitted data and the identification of an individual in data transmission between stations utilizing identification information about the individual which is pre-stored and identification information supplied by the individual, the method comprising the steps of:

generating a selected number that is different for each data transmission;

producing a first encryption key in response to the generated selected number and to identification information supplied by an individual at a first station;

encoding data in ccordance with the first encryption key;

transmitting the generated selected number and the encoded data to a second station;

producing a second encryption key utilizing the pre-stored identification information and the transmitted selected number; and decoding the encoded data in accordance with the second encryption key.

3. A method of simultaneously securing transmitted data and the identification of an individual in data transmission between stations utilizing identification information supplied by the individual, the method comprising the steps of:

generating and storing a first selected number that is different for each data transmission;

producing and storing a first key in response to the first selected number and to a first identification information supplied by an individual at a first station;

producing a second key in response to the stored first selected number and to second identification information supplied by an individual;

generating a second selected number that is different for each data transmission;

producing a third key in response to the second selected number and to the second identification information supplied by the individual;

encoding in accordance with the second key selected information including data and the second selected number and the third key;

transmitting the encoded information to a second station;

decoding the encoded information in accordance with the stored first key; and storing the second selected number and third key of the decoded information for subsequent use.

4. Apparatus for simultaneously securing transmitted data and the identification of an individual when transmitting the data between stations utilizing identification information about the individual which is pre-stored and identification information supplied by the individual, the apparatus comprising:

means for generating a selected number that is different for each data transmission;

means coupled to receive the generated selected number and to receive identification information supplied by an individual at a first station for producing a first encryption key;

means coupled to receive data and the first encryption key for encoding the data in accordance with the first encryption key;

means responsive to the pre-stored identification information and coupled to receive the generated selected number for producing a second encryption key; and means disposed at a second station to receive the encoded data and the second encryption key for decoding the encoded data in accordance with the second encryption key.

5. Apparatus for simultaneously securing transmitted data and the identification of an individual when transmitting the data between staions utilizing identification information supplied by the individual, the apparatus comprising:

means for generating a first and a second selected number, each of which is different from each data transmission;

means coupled to the generating means for storing the first selected number;

means coupled to receive the first selected number and to receive a first identification information supplied by an individual at a first station for producing a first key, for producing a second key in response to the stored first selected number and to a second identification information supplied by an individual, and for producing a third key in response to the second selected number and to the second identification information supplied by the individual, the means for storing being disposed for receiving and storing the first key;

means coupled to receive data, the second selected number, and the second and third keys for encoding in accordance with the second key selected information including the data and the second selected number and the third key; and means coupled to the means for storing and disposed at a second station to receive the encoded information for decoding the encoded information in accordance with the stored first key, the means for storing also being disposed for storing the second selected number and the third key of the decoded information for subsequent use.

* * * * *